United States Patent
Belling et al.

(10) Patent No.: US 12,513,201 B2
(45) Date of Patent: Dec. 30, 2025

(54) NEGOTIATION APPLICABILITY FOR INACTIVE OR IDLE RECEPTION OF A MULTICAST SERVICE

(71) Applicant: NOKIA SOLUTIONS AND NETWORKS OY, Espoo (FI)

(72) Inventors: Horst Thomas Belling, Erding (DE); Philippe Godin, Versailles (FR)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 18/960,934

(22) Filed: Nov. 26, 2024

(65) Prior Publication Data

US 2025/0097274 A1   Mar. 20, 2025

Related U.S. Application Data

(63) Continuation of application No. 18/850,465, filed as application No. PCT/EP2023/057349 on Mar. 22, 2023.

(30) Foreign Application Priority Data

Mar. 29, 2022 (EP) .................................. 22165167

(51) Int. Cl.
*H04W 76/20* (2018.01)
*H04L 65/1093* (2022.01)
*H04L 65/611* (2022.01)
*H04W 24/10* (2009.01)
*H04W 76/40* (2018.01)

(52) U.S. Cl.
CPC ........ *H04L 65/1093* (2013.01); *H04L 65/611* (2022.05); *H04W 24/10* (2013.01); *H04W 76/20* (2018.02); *H04W 76/40* (2018.02)

(58) Field of Classification Search
None
See application file for complete search history.

(56) References Cited

U.S. PATENT DOCUMENTS

| | | | |
|---|---|---|---|
| 2021/0321226 A1* | 10/2021 | Zhang | H04L 1/1861 |
| 2022/0053455 A1 | 2/2022 | Baek et al. | |
| 2025/0097962 A1* | 3/2025 | Baek | H04L 1/1812 |

FOREIGN PATENT DOCUMENTS

EP   4255020 A1   10/2023

OTHER PUBLICATIONS

"3rd Generation Partnership Project; Technical Specification Group Services and System Aspects; Study on architectural enhancements for 5G multicast-broadcast services; Phase 2 (Release 18)", 3GPP TR 23.700-47 v0.1.0, (Feb. 2022), 17 pages.

(Continued)

*Primary Examiner* — Cai Y Chen
(74) *Attorney, Agent, or Firm* — ALSTON & BIRD LLP

(57) ABSTRACT

An apparatus, in a user equipment, is provided, the apparatus comprising: at least one processor and at least one memory including computer program code, the at least one memory and the computer program code configured to, with the at least one processor, cause the apparatus at least to receive an indication whether a transmission mode for inactive/idle reception of multicast is applied for a multicast session, and based on the indication, perform procedures to enable reception of the multicast session using the transmission mode for inactive/idle mode reception.

16 Claims, 12 Drawing Sheets

(56) References Cited

OTHER PUBLICATIONS

"3rd Generation Partnership Project; Technical Specification Group Services and System Aspects; Architectural enhancements for 5G multicast-broadcast services; Stage 2 (Release 17)", 3GPP TS 23.247 v1.1.0, (Aug. 2021), 96 pages.

Ericsson, "[Draft] Reply LS on RAN impact of FS_5MBS Study", 3GPP TSG-RAN WG3 Meeting #110-e, R3-206538, (Nov. 2020), 3 pages.

Huawei et al., "New SID: Architectural enhancements for 5G multicast-broadcast services Phase 2", TSG SA Meeting #SP-94E, SP-211645, (Dec. 14-20, 2021), 5 pages.

International Search Report and Written Opinion for Patent Cooperation Treaty Application No. PCT/EP2023/057349 dated Jun. 28, 2023, 16 pages.

Office Action for European Application No. 23713362.4 dated Nov. 8, 2024, 8 pages.

Office Action for European Application No. 23713362.4 dated May 13, 2025, 9 pages.

Office Action for Japanese Application No. 2024-552222 dated Jul. 22, 2025, 6 pages.

\* cited by examiner

NEGOTIATION APPLICABILITY FOR INACTIVE OR IDLE RECEPTION OF A MULTICAST SERVICE

CROSS-REFERENCE TO RELATED APPLICATIONS

This application is a continuation of U.S. application Ser. No. 18/850,465, filed Sep. 24, 2024, which is a 371 of International Application No. PCT/EP2023/057349, filed Mar. 22, 2023, which claims priority to European Patent Application No. 22165167.2 filed Mar. 29, 2022, the entire contents of which are incorporated herein by reference.

TECHNICAL FIELD

Various example embodiments described herein relate to an apparatus, a method and a computer program product for enabling inactive or idle reception of a multicast service.

BACKGROUND

The following meanings for the abbreviations used in this specification apply:
AF Application Function
AMF Access and Mobility Management Function
AS Application Server
DL Downlink
MBS Multicast/Broadcast Service
MBSF Multicast/Broadcast Service Function
MB-SMF Multicast/Broadcast Session Management Function
MB-UPF Multicast/Broadcast User Plane Function
NEF Network Exposure Function
NG-RAN Next Generation Radio Access Network
NRF Network Repository Function
PCC Policy Control and Charging
PDU Protocol Data Unit
Qos Quality of Service
RAN Radio Access Network
RRC Radio Resource Control
SMF Session Management Function
TMGI Temporary Mobile Group Identity
UE User Equipment 5G multicast and broadcast procedures are defined, for example, in TS 23.247.

It is possible for UEs attending a multicast session to perform an inactive/idle reception of multicast. In this way, no feedback concerning the radio reception is sent from the UE to the network.

However, the service quality may be affected by the inactive/idle reception of multicast. On the one hand this feature enables the reception by higher number of UEs in the same cells, since the UEs do not send feedback to the network. On the other hand, radio transmission is not adjusted based on feedback by inactive or idle UEs and transmission errors may thus increase.

SUMMARY

Example embodiments aim to improve, among other things, handling of multicast transmissions.

According to a first aspect, an apparatus, in a user equipment, is provided, the apparatus comprising: at least one processor and at least one memory including computer program code, the at least one memory and the computer program code configured to, with the at least one processor, cause the apparatus at least to receive an indication whether a transmission mode for inactive/idle reception of multicast is applied for a multicast session, and based on the indication, perform procedures to enable reception of the multicast session using the transmission mode for inactive/idle mode reception.

According to a second aspect, a method, in a user equipment, is provided, the method comprising:
receiving an indication whether a transmission mode for inactive/idle reception of multicast is applied for a multicast session, and
based on the indication, performing procedures to enable reception of the multicast session using the transmission mode for inactive/idle mode reception.

The first and second aspects may be modified as follows:
The indication as to whether inactive/idle reception of multicast is applied for the multicast session may be included in the announcement for the multicast session.

A join request message for the multicast session may be sent to a network control element, and a join accept message may be received from the network control element, wherein the join accept message may comprise the indication as to whether the transmission mode for inactive/idle reception is enabled for the multicast session.

Support for idle/inactive reception of multicast may be indicated in the join request message.

The procedures to enable reception of the multicast session using the transmission mode for inactive/idle mode reception may comprise monitoring broadcasted information whether the transmission mode for inactive/idle reception of multicast is applied for the multicast session in the cell where the UE is located.

Data of the multicast session may be received while in RRC-inactive or RRC-idle state.

When inactive/idle reception of multicast is to be applied for the multicast session, feedback concerning reception of the multicast session to the network may be omitted while the transmission mode for inactive/idle reception of multicast is applied, or less feedback concerning reception of the multicast session may be transmitted to the network while the transmission mode for inactive/idle reception of multicast is applied than in case the transmission mode for inactive/idle reception of multicast is not applied for the multicast session.

According to a third aspect, an apparatus, in network element performing an application function, is provided, the apparatus comprising: at least one processor and at least one memory including computer program code, the at least one memory and the computer program code configured to, with the at least one processor, cause the apparatus at least to request creation of a multicast session, and indicate whether a transmission mode for inactive/idle reception of multicast is to be enabled for the multicast session.

According to a fourth aspect, a method, in network element performing an application function, is provided, the method comprising:
requesting creation of a multicast session, and
indicating whether a transmission mode for inactive/idle reception of multicast is to be enabled for the multicast session.

The third and fourth aspects may be modified as follows:
A service announcement for the multicast session directed to a user equipment may be prepared, the service announcement comprising an indication whether the transmission mode for inactive/idle reception of multicast is to be enabled for the multicast session.

According to a fifth aspect, an apparatus, in a network element performing a multicast-broadcast session management function, is provided, the apparatus comprising: at least one processor and at least one memory including computer program code, the at least one memory and the computer program code configured to, with the at least one processor, cause the apparatus at least to manage a multicast session, and indicate to network elements involved with the multicast session whether a transmission mode for inactive/idle reception of multicast is to be enabled for the multicast session.

According to a sixth aspect, a method, in a network element performing a multicast-broadcast session management function, is provided, the method comprising:
  managing a multicast session, and
  indicating to network elements involved with the multicast session whether a transmission mode for inactive/idle reception of multicast is to be enabled for the multicast session.

The fifth and the sixth aspects may be modified as follows:

An indication as to whether a transmission mode for inactive/idle reception of multicast is to be enabled for the multicast session may be received from the application function, the multicast/broadcast service function, or the network exposure function requesting creation of the multicast session.

The indication as to whether the transmission mode for inactive/idle reception of multicast is to be enabled for the multicast session may be preconfigured in the network.

The indication to network elements involved with the multicast session whether the transmission mode for inactive/idle reception of multicast is to be enabled for the multicast session may comprise at least one of:
  an indication to a session management function whether the transmission mode for inactive/idle reception of multicast is to be enabled for the multicast session in a Nmbsmf_MBSSession_ContextStatusSubscribe response;
  an indication to an access management function whether the transmission mode for inactive/idle reception of multicast is to be enabled for the multicast session in an Nsmf_PDUSession_UpdateSMContext response; or
  an indication to an radio access network node whether the transmission mode for inactive/idle reception of multicast is to be enabled for the multicast session in an N2 session management container.

According to a seventh aspect, an apparatus, in a network element performing a session management function, is provided, the apparatus comprising: at least one processor and at least one memory including computer program code, the at least one memory and the computer program code configured to, with the at least one processor, cause the apparatus at least to receive a join request message for a multicast session from a user equipment, and send a join accept message in response to the join request message, wherein the join accept message comprises an indication as to whether a transmission mode for inactive/idle reception of multicast is to be enabled for the multicast session.

According to an eighth aspect, a method, in a network element performing a session management function, is provided, the method comprising:
  receiving a join request message for a multicast session from a user equipment, and
  sending a join accept message in response to the join request message, wherein the join accept message comprises an indication as to whether a transmission mode for inactive/idle reception of multicast is to be enabled for the multicast session.

The seventh and eighth aspects may be modified as follows:

The join accept message may comprise the indication as to whether the transmission mode for inactive/idle reception of multicast is to be enabled in at least one of: an N1 session management container to be transmitted to the user equipment; or an N2 session management container to be transmitted to an radio access network node.

The join request message for the multicast session received from the user equipment may comprise information that the user equipment supports the transmission mode for idle/inactive reception of multicast.

An indication may be received from a multicast-broadcast session management function as to whether the transmission mode for inactive/idle reception of multicast is to be enabled for the multicast session.

The sent indication as to whether the transmission mode for inactive/idle reception of multicast is to be enabled for the multicast session may be determined based on at least one of: the received indication from the multicast-broadcast session management function; or the received information from the user equipment that that the user equipment supports the transmission mode for idle/inactive reception of multicast.

According to a ninth aspect, an apparatus, in a network element performing a radio access network node, is provided, the apparatus comprising: at least one processor and at least one memory including computer program code, the at least one memory and the computer program code configured to, with the at least one processor, cause the apparatus at least to receive information about a multicast session comprising an indication as to whether the transmission mode for inactive/idle reception of multicast is to be enabled for the multicast session; decide, at least partially based on the received indication, whether to apply the transmission mode for inactive/idle reception of multicast for the multicast session in at least one radio cell served by the apparatus; and transmit data of the multicast session in the radio cell using the decided transmission mode.

According to a tenth aspect, a method, in a network element performing a radio access network node, is provided, the method comprising:
  receiving information about a multicast session comprising an indication as to whether the transmission mode for inactive/idle reception of multicast is to be enabled for the multicast session:
  deciding, at least partially based on the received indication, whether to apply the transmission mode for inactive/idle reception of multicast for the multicast session in at least one radio cell served by the apparatus; and
  transmitting data of the multicast session in the radio cell using the decided transmission mode.

The ninth and tenths aspects may be modified as follows:

An indication may be broadcasted in the at least one radio cell as to whether the transmission mode for inactive/idle reception of multicast is applied for the multicast session; a user equipment that joined the multicast session located within the at least one radio cell may be kept in RRC-connected state while the multicast session is active if the transmission mode for inactive/idle reception of multicast is not being applied for the multicast session; and a user equipment that joined the multicast session located within the at least one radio cell may be allowed to transition to RRC-inactive state or RRC-idle state while the multicast session is active if the transmission mode for inactive/idle reception of multicast is being applied for the multicast session.

According to an eleventh computer program product is provided which comprises code means for performing a method according to any one of the second, fourth, sixth, eighth and tenths aspects and/or their modifications when run on a processing means or module. The computer program product may be embodied on a computer-readable medium, and/or the computer program product may be directly loadable into the internal memory of the computer and/or transmittable via a network by means of at least one of upload, download and push procedures.

According to a twelfth aspect, an apparatus is provided which comprises:
  means for receiving an indication whether a transmission mode for inactive/idle reception of multicast is applied for a multicast session, and
  means for, based on the indication, performing procedures to enable reception of the multicast session using the transmission mode for inactive/idle mode reception.

According to a thirteenth aspect, an apparatus is provided which comprises:
  means for requesting creation of a multicast session, and
  means for indicating whether a transmission mode for inactive/idle reception of multicast is to be enabled for the multicast session.

According to a fourteenth aspect, an apparatus is provided which comprises:
  means for managing a multicast session, and
  means for indicating to network elements involved with the multicast session whether a transmission mode for inactive/idle reception of multicast is to be enabled for the multicast session.

According to a fifteenth aspect, an apparatus is provided which comprises:
  means for receiving a join request message for a multicast session from a user equipment, and
  means for sending a join accept message in response to the join request message, wherein the join accept message comprises an indication as to whether a transmission mode for inactive/idle reception of multicast is to be enabled for the multicast session.

According to a sixteenth aspect, an apparatus is provided which comprises:
  means for receiving information about a multicast session comprising an indication as to whether the transmission mode for inactive/idle reception of multicast is to be enabled for the multicast session;
  means for deciding, at least partially based on the received indication, whether to apply the transmission mode for inactive/idle reception of multicast for the multicast session in at least one radio cell served by the apparatus; and
  means for transmitting data of the multicast session in the radio cell using the decided transmission mode.

BRIEF DESCRIPTION OF THE DRAWINGS

These and other objects, features, details and advantages will become more fully apparent from the following detailed description of example embodiments, which is to be taken in conjunction with the appended drawings, in which.

DETAILED DESCRIPTION

In the following, description will be made to example embodiments. It is to be understood, however, that the description is given by way of example only, and that the described example embodiments are by no means to be understood as limiting.

Example embodiments, although not limited to this, relate to 5G multicast and broadcast procedures, as defined, for example, in TS 23.247.

Before describing example embodiments, in the following, some problems addressed by certain example embodiments are discussed in some more detail.

As mentioned above, in multicast transmissions, the service quality may be affected by the inactive/idle reception of multicast. On the one hand this feature enables the reception by higher number of UEs in the same cells, since the UEs do not send feedback to the network. On the other hand, radio transmission is not adjusted based on feedback by inactive or idle UEs and transmission errors may thus increase. Thus, according to some embodiments, an external entity creating a multicast session is enabled to control the service quality (i.e. whether to apply inactive/idle reception of multicast).

In more detail, an external entity creating a multicast session should be able to control the service quality (i.e. whether to apply inactive/idle reception of multicast). An inactive/idle mode reception may enable a service for more UEs in a cell. However, the service quality for the individual UE may deteriorate.

Example embodiments are directed to provide an improved handling of multicast transmissions considering the above issues.

In the following, a general overview of some example embodiments is described by referring to FIGS. 1A, 1B, 2A, 2B, 3A, 3C, 4A, 4B, 5A and 5C.

Figure 1A:
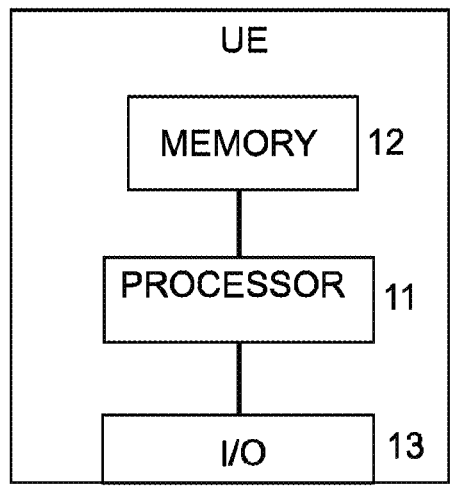
FIG. 1A shows a UE 1 according to an example embodiment.
Figure 1B:
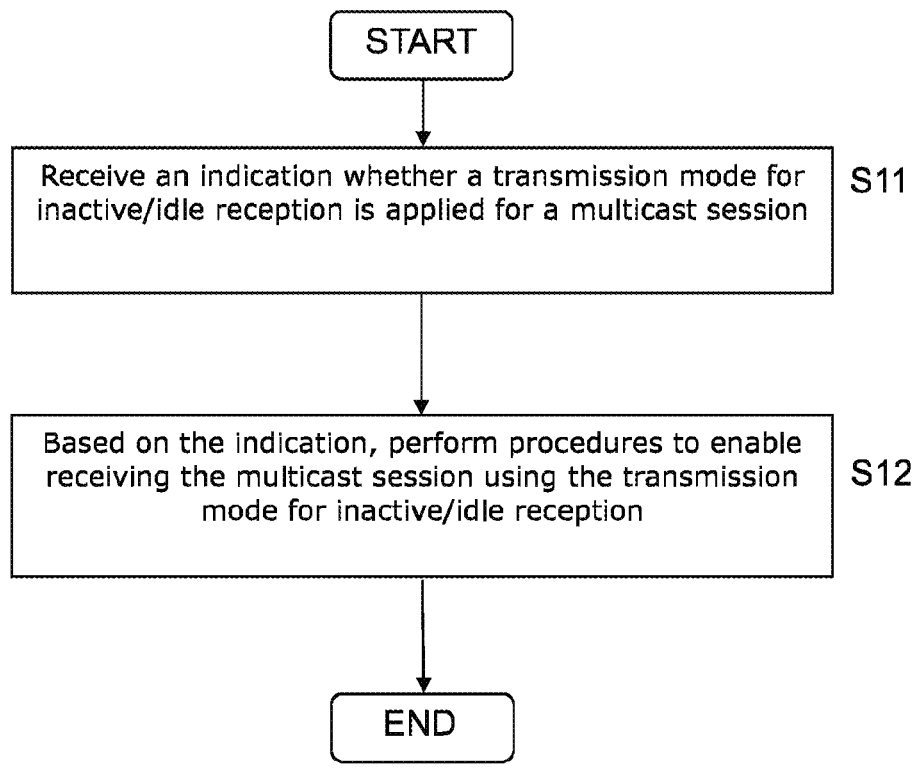
FIG. 1B shows a process carried out by the UE 1 according to the example embodiment.

FIG. 1A shows a UE 1 according to the present example embodiment. The UE 1 is an example for an apparatus, which could be a part of a user equipment. A procedure carried out by the UE 1 is illustrated in FIG. 1B. The UE 1 shown in FIG. 1A includes at least one processor 11 and at least one memory 12 including computer program code. The at least one processor 11, with the at least one memory 12 and the computer program code, is configured to cause the apparatus to receive an indication whether a transmission mode for inactive/idle reception is enabled for a multicast session (S11 in FIG. 1B), and based on the indication, perform procedures to enable receiving the multicast session using the transmission mode for inactive/idle reception (S12 in FIG. 1B).

Figure 2A:
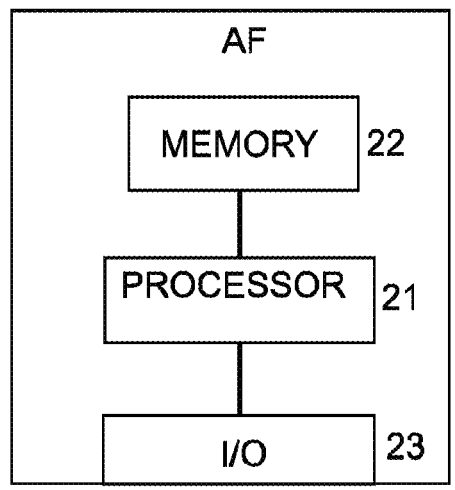
FIG. 2A shows an AF 2 according to an example embodiment.
Figure 2B:
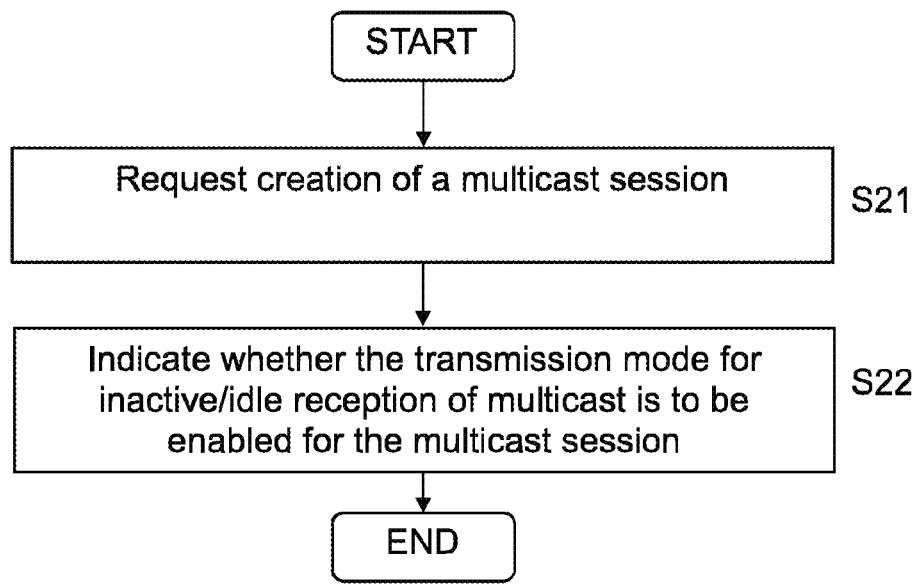
FIG. 2B shows a process carried out by the AF 2 according to the example embodiment.

FIG. 2A shows an AF 2 as an example for an apparatus performing an application function, and is an example for an external entity, which may request to establish a multicast session. A procedure carried out by the AF 2 is shown in FIG. 2B. The AF 2 shown in FIG. 2A includes at least one processor 21 and at least one memory 22 including computer program code. The at least one processor 21, with the at least one memory 22 and the computer program code, is configured to cause the apparatus to request creation of a multicast session (S21 in FIG. 2B), and indicate whether the transmission mode for inactive/idle reception of multicast is to be enabled for the multicast session (S22 in FIG. 2B).

Figure 3A:
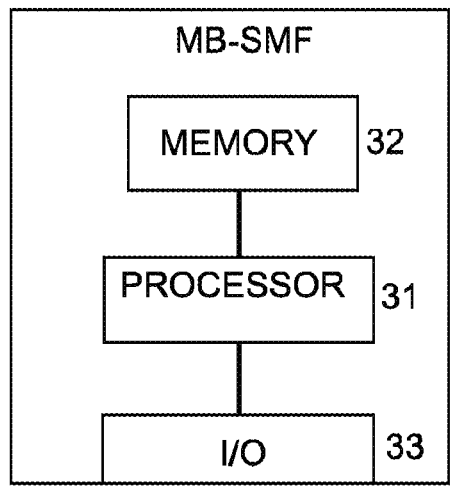
FIG. 3A shows a MB-SMF 3 according to an example embodiment.
Figure 3B:
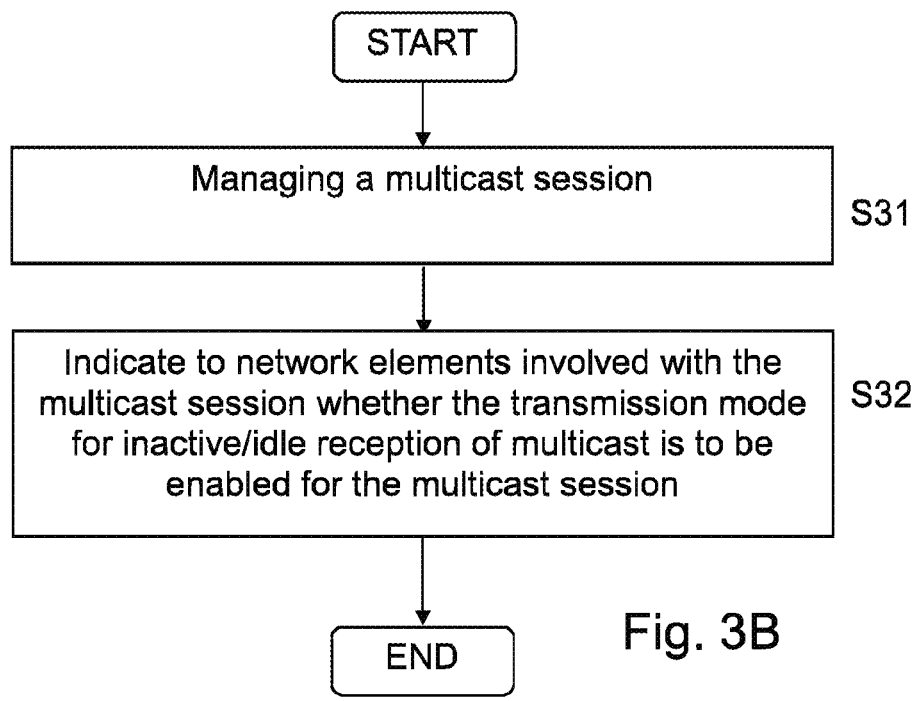
FIG. 3B shows a process carried out by the MB-SMF 3 according to the example embodiment.

FIG. 3A shows an MB-SMF 3 as an example for an apparatus performing a multicast-broadcast session management function. A procedure carried out by the MB-SMF 3 is shown in FIG. 3B. The MB-SMF 3 shown in FIG. 3A includes at least one processor 31 and at least one memory 32 including computer program code. The at least one processor 31, with the at least one memory 32 and the computer program code, is configured to cause the apparatus to manage a multicast session and indicate to network elements (e.g., UE 1 shown in FIG. 1A, SMF 4 shown in FIG. 4A, RAN shown in FIG. 5A) involved with the multicast session whether a transmission mode for inactive/idle mode inactive/idle reception of multicast is to be enabled for the multicast session (S32 in FIG. 3B).

Figure 4A:
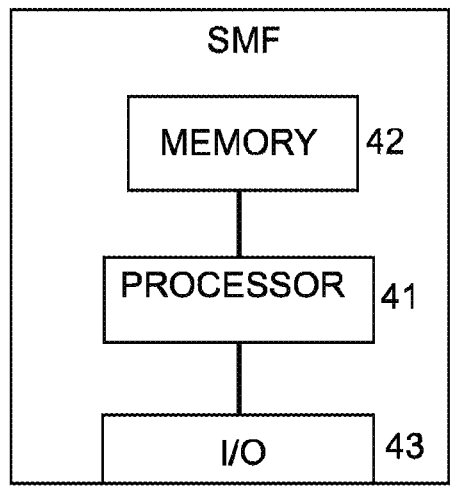
FIG. 4A shows a SMF 4 according to an example embodiment.
Figure 4B:
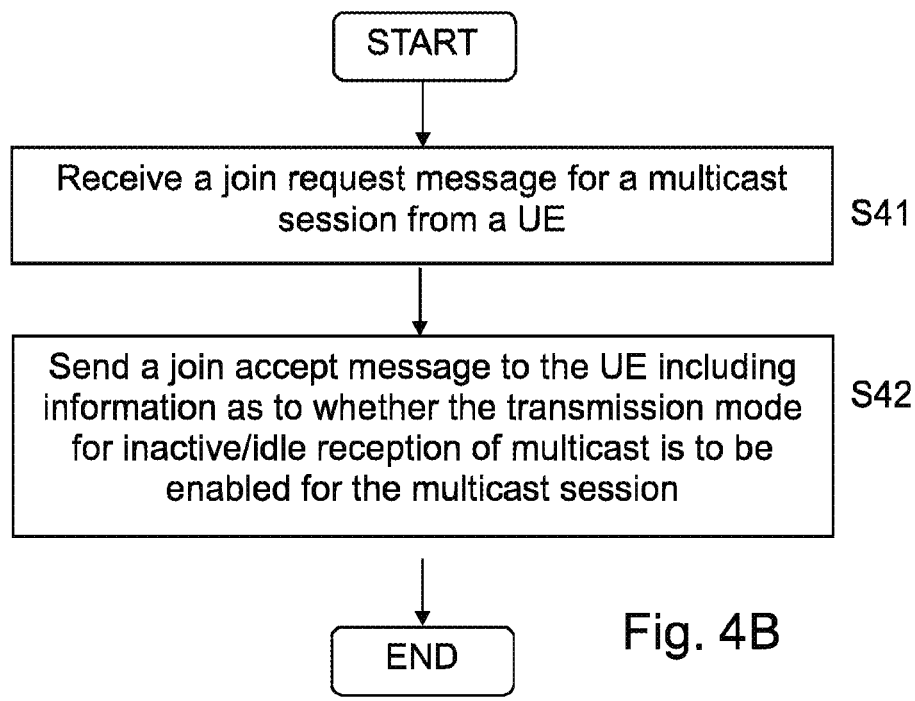
FIG. 4B shows a process carried out by the SMF 4 according to the example embodiment.

FIG. 4A shows an SMF 4 as an example for an apparatus performing a session management function. A procedure carried out by the SMF 4 is shown in FIG. 4B. The SMF 4 shown in FIG. 4A includes at least one processor 41 and at least one memory 42 including computer program code. The at least one processor 41, with the at least one memory 42 and the computer program code, is configured to cause the apparatus to receive a join request message for a multicast session from a user equipment (e.g., UE 1 shown in FIG. 1A) (S41 in FIG. 4B), and send a join accept message in response to the join request message, wherein the join accept message includes information as to whether a transmission mode for inactive/idle reception of multicast is to be enabled for the multicast session (S42 in FIG. 4B).

Figure 5A:
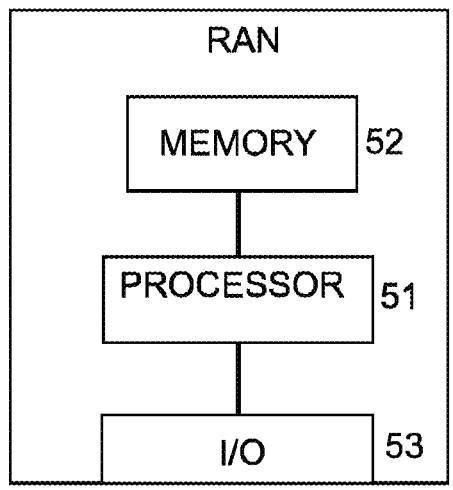
FIG. 5A shows a RAN node according to an example embodiment.
Figure 5B:
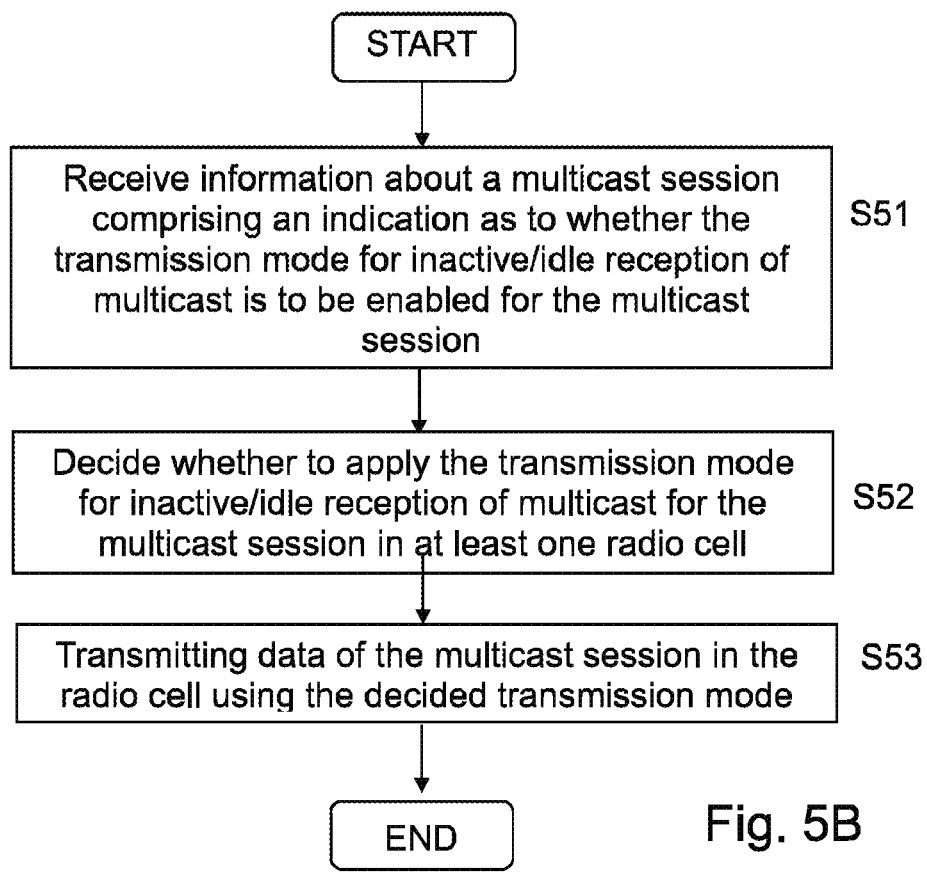
FIG. 5B shows a process carried out by the RAN node according to the example embodiment, FIG. 6 containing

FIG. 5A shows an RAN 5 as an example for an apparatus performing a session management function. A procedure carried out by the RAN 5 is shown in FIG. 5B. The RAN-54 shown in FIG. 5A includes at least one processor 51 and at least one memory 52 including computer program code. The at least one processor 51, with the at least one memory 52 and the computer program code, is configured to cause the apparatus to receive information about a multicast session comprising an indication as to whether the transmission mode for inactive/idle reception of multicast is to be enabled for the multicast session (S51 in FIG. 5B), decide, at least partially based on the received indication, whether to apply the transmission mode for inactive/idle reception of multicast for the multicast session in at least one radio cell served by the apparatus (S52 in FIG. 5B), and transmit data of the multicast session in the radio cell using the decided transmission mode (S53 in FIG. 5B).

Thus, according to example embodiments, a new kind of information is provided in a network, namely information as to whether the transmission mode for inactive/idle reception of multicast is to be enabled for a multicast session. Based on this information, the network elements involved in the multicast session can configure their operations accordingly. For example, the UE 1 may send no feedback concerning the reception of the multicast session (e.g., no feedback concerning the radio quality) to the network, so that less traffic is caused and more UEs could take part in the multicast session.

The information as to whether the transmission mode for inactive/idle reception of multicast is to be enabled for a multicast session can be sent in several messages, for example when establishment of the multicast session is requested. Alternatively, the information can be pre-configured in the network.

The term "inactive/idle reception of multicast" can also be referred to as "passive reception of multicast" and means that in response to receiving multicast, the receiver (e.g., UE 1) does not have to send any response, for example no feedback, as mentioned above.

Hence, it is possible for the creator of a multicast session (AF 2) and/or the network operator to decide whether or not there should be inactive/idle reception of multicast in the network or for a certain multicast session. That is, the creator of the multicast session or the network operator can decide whether to increase the number of UEs which could take part in a multicast session, at the cost of radio quality, or whether to ensure radio quality at the cost of a reduced number of UEs involved in a multicast session.

The information as to whether the transmission mode for inactive/idle reception of multicast is to be enabled for a multicast session can be present in the form of a parameter such as an "idle/inactive reception indicator".

The apparatuses 1 to 4 shown in FIGS. 1A, 2A, 3A and 4A may include more components than described above, and may further include I/O units 13, 23, 33, 43, which are capable of transmitting to and receiving from other network elements.

Figure 6A:
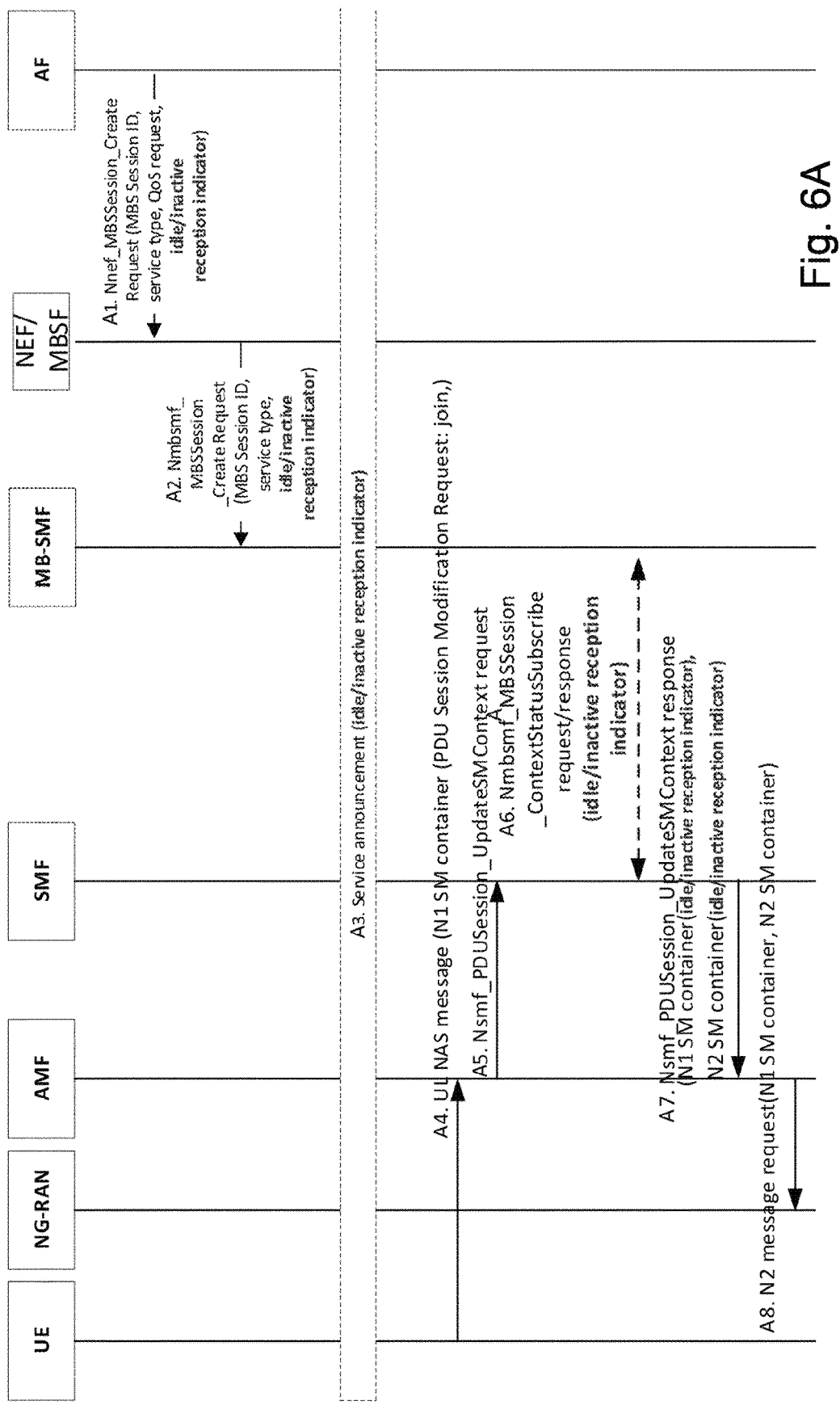
FIGS. 6A and 6B shows a signal flow between several network elements when creating a multicast session according to an example embodiment, FIG. 7 containing
Figure 6B:
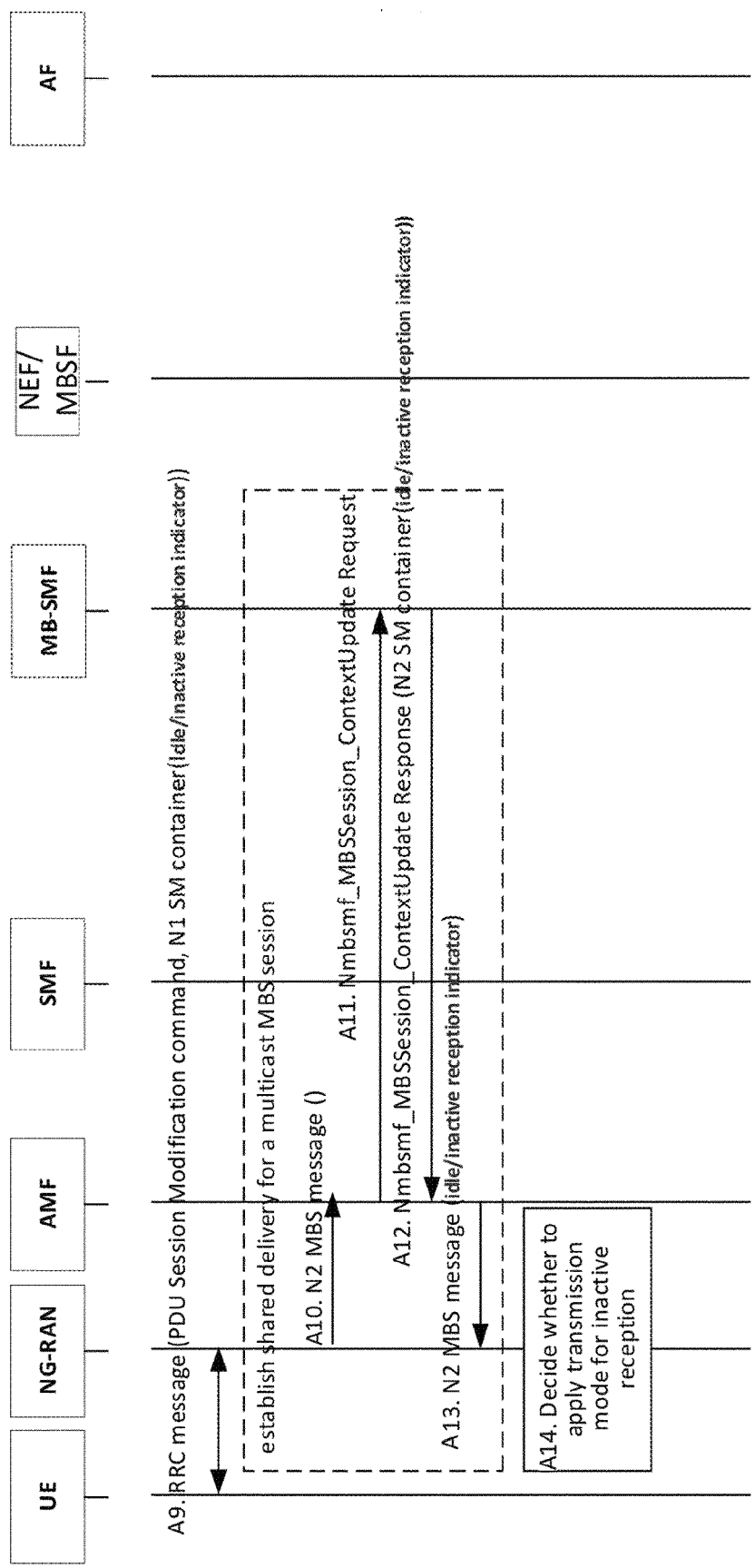

In the following, the procedures described above are described in the following by referring to some further detailed embodiments, wherein it is also referred to FIG. 6 described later in more detail. FIG. 6 containing FIGS. 6A and 6B shows a signal flow between several network elements when creating a multicast session according to an example embodiment, wherein FIG. 6A shows processes A1 to A8, and FIG. 6B shows processes A9 to A14.

In particular, according to some example embodiments, when an AF requests the creation of a multicast MBS session, it indicates whether inactive/idle reception of multicast shall be enabled for that session (see also A1 in FIG. 6). The AF may also indicate in the service announcement towards the UE whether the transmission mode for inactive/idle reception of multicast is to be enabled (see also A3 in FIG. 6)

Alternatively, information whether inactive/idle reception of multicast is enabled for a multicast session is preconfigured in the network.

The MB-SMF indicates to the RAN node whether inactive/idle reception of multicast is applicable when the RAN requests shared delivery for a multicast MBS session (see also A10 to A14 in FIG. 6)

The MB-SMF may also indicate towards an SMF whether the transmission mode for inactive/idle reception of multicast is enabled when the SMF requests the creation of MBSSessionContext for the MBS session (see A6 in FIG. 6)

When the SMF replies to a join request of a UE, it indicates in the join accept whether the transmission mode for inactive/idle reception is enabled for the multicast session based on at least one of the network capabilities, the user equipment capabilities, and the information about the multicast session provided by the AF or the preconfigured information about the multicast session.

When inactive/idle reception is applicable for a multicast session and UE:
the network and UE may negotiate that the UE transition to RRC-inactive or RRC-idle state while the UE is within an active multicast,
the UE listens to multicast transmission and related radio signaling while in RRC-inactive or RRC-idle state, and
the UE sends less or no radio level feedback about multicast reception while in RRC-inactive or RRC-idle state.

When a multicast session is activated and the transmission mode for inactive/idle reception is applied, the network may not page the UE. In this way, further traffic is reduced.

In the following, an example is described how an AF requests creating of a session by referring to the flow chart shown in FIG. 6. The elements involved are UE, NG-RAN, AMF, SMF, MB-SMF, NEF/MBSF and AF.

It is assumed that the AF would like to establish a multicast session. In A1, the AF sends a Nnef_MBSSession_Create Request (MBS Session ID, service type, QoS request, idle/inactive reception indicator) to the NEF/MBSF. It is noted that the "idle/inactive reception indicator" is a new parameter according to the present embodiment, and is an example for "information as to whether the transmission mode for inactive/idle reception of multicast is to be enabled for the multicast session".

In A2, the NEF/MBSF forwards the request (i.e., Nmbsmf_MBSSession_Create Request (MBS Session ID, service type, idle/inactive reception indicator) to the MB-SMF.

In A3, the MB-SMF establishes a session announcement including the new idle/inactive reception indicator.

Thereafter, it is assumed that an UE would like to join the multicast session announced by the session announcement. Thus, in A4, the UE sends a UL NAS message (N1 SM container (PDU Session Modification Request: join)) to the AMF. In A5, the AMF sends a Nsmf_PDUSession_UpdateSMContext request to the SMF. In A6, a subscribe procedure is carried out by transmitting Nmbsmf_MBSSession_ContextStatusSubscribe request/response (idle/inactive reception indicator) between the SMF and the MB-SMF. It is noted that here the new idle/inactive reception indicator is included.

In A7, the SMF sends a Nsmf_PDUSession_UpdateSMContext response (N1 SM container (idle/inactive reception indicator), N2 SM container (idle/inactive reception indicator) to the AMF. It is noted that also this message contains the new idle/inactive reception indicator. In A8, the AMF sends a N2 message request including the N1 SM container and N2 SM container received in A7 to the NG-RAN. Thereafter in A9, an RRC modification is carried out, by transmitting a RRC message (PDU Session Modification command, N1 SM container (Idle/inactive reception indicator)) between the NG-RAN and the UE.

If the NG-RAN decides to establish shared delivery for a multicast MBS session it executes A10 to A13. In A10, the NG-RAN sends a N2 MBS message ( ) to the AMF. In A11, the AMF sends a Nmbsmf_MBSSession_ContextUpdate Request to the MB-SMF. In A12, the MB-SMF responds with a Nmbsmf_MBSSession_ContextUpdate Response, which includes the new idle/inactive reception indicator. In A13, the AMF sends a N2 MBS message (idle/inactive reception indicator) to the NG-RAN.

Figure 7A:
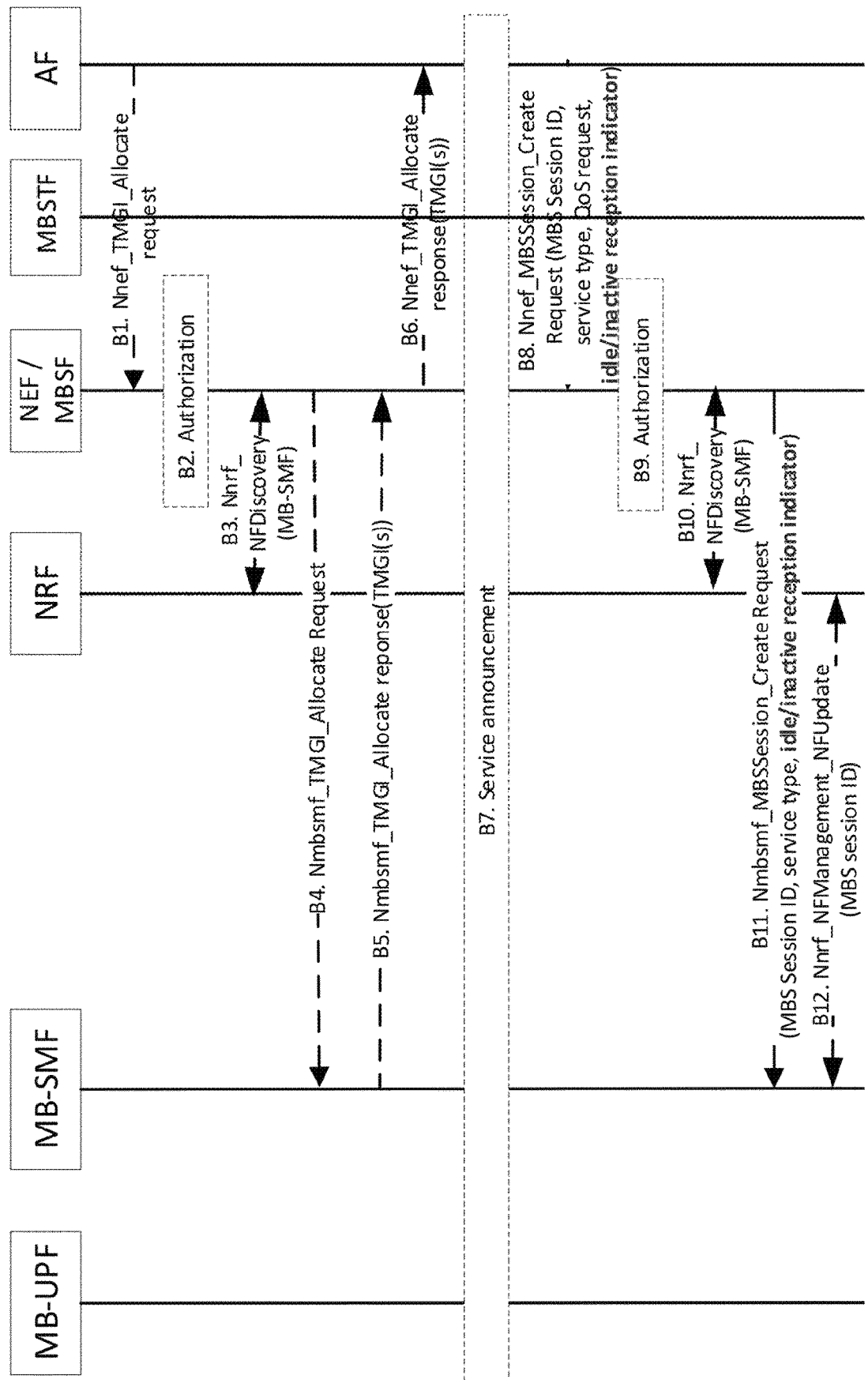
FIGS. 7A and 7B shows an MBS session creation without PCC according to an example embodiment.
Figure 7B:
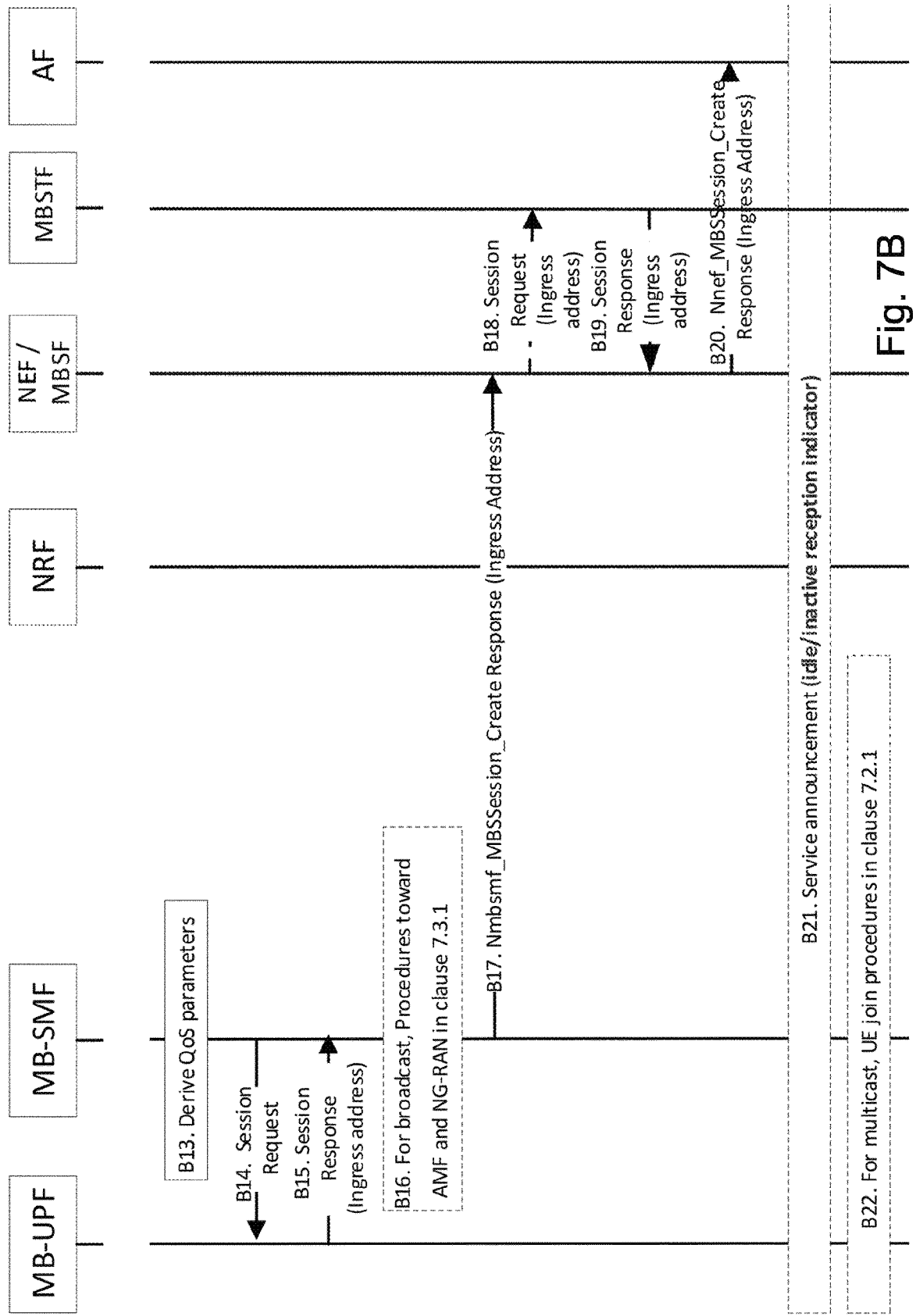

A further embodiment is describe by referring to FIG. 7, which is based on Figure 7.1.1.2-1 of TS 23.247 and illustrates an MBS session creation without PCC. In the following, the additions introduced according to the example embodiment are emphasized. FIG. 7 contains FIG. 7A showing processes B1 to B12 and FIG. 7B showing processes B13 to B22.

In B1 the AF sends Nnef_TMGI_Allocate Request (TMGI number) message to NEF/MBSF to request allocation of a TMGI(s) to identify new MBS session(s). In B2 the NEF checks authorization of AF. In B3, the NEF/MBSF discovers and selects an MB-SMF using NRF or based on local configuration. In B4, the NEF/MBSF sends an Nmbsmf_TMGI_Allocate Request (TMGI number) message to the MB-SMF. In B5, the MB-SMF allocates TMGI(s) and returns the TMGI(s) to the NEF/MBSF via the Nmbsmf_TMGI_Allocate response (TMGI(s), expiration time). In B6, the NEF or MBSF responds to the AF by sending an Nnef_TMGI_Allocate Response (TMGI(s), expiration time). In B7, the AF may perform a Service Announcement towards UEs.

In B8, it is assumed that the AF of a content provider requests creation of a multicast session. In particular, the AF sends a Nnef_MBSSession_Create request including MBS Session ID, service type, QoS request and the new idle/inactive reception indicator to the NEF/MBSF. In B9, the NEF/MBSF checks authorization of content provider. In B10, the NEF/MBSF discovers MB-SMF candidates and selects the MB-SMF as ingress control node, possibly based on MBS service area. If a TMGI is included in B8, NEF/MBSF finds MB-SMF based on that TMGI. In B11, the NEF/MBSF sends a Nmbsmf_MBSSession_Create Request including MBS Session ID, service type, TMGI allocation indication, MBS service area information, ingress transport address request indication and the new idle/inactive reception indicator to the MB-SMF.

In B12, if a source specific multicast is provided as MBS Session ID in B11, the MB-SMF updates its NF profile at the NRF with the serving MBS Session ID. If an MBS service area information was received in B11, the MB-SMF updates its NF profile at the NRF with that information. In B13, the MB-SMF derives the required QoS parameters locally.

In B14, the MB-SMF selects the MB-UPF, and sends a Session Request to the selected MB-UPF. In B15, if requested, MB-UPF selects an ingress address (IP address and port) and a tunnel endpoint for the outgoing data and provides it to MB-SMF. In B16, for broadcast communication, the MB-SMF continues the procedure towards the AMF and NG-RAN as specified in clause 7.3.1. In B17, the MB-SMF indicates the possibly allocated ingress address to the NEF/MBSF. In B18, which is optional, if the MBSF decides to use an MBSTF, the NEF/MBSF provides the ingress address received in B17 towards the MBSTF as DL destination. In B19, which is conditional on B18, if requested, the MBSTF selects an ingress address (IP address and port) and provides it to NEF/MBSF. In B20, the NEF/MBSF-C indicates the possibly allocated ingress address and other parameters (e.g. TMGI) to the AF via an Nnef_MBSSession_Create response ([TMGI], [Allocated ingress address])). In B21, which is the same as B7, the AF may also perform a service announcement at this stage. In particular, the service announcement includes the new idle/inactive reception indicator. In B B22, for multicast communication, depending on configuration UEs can join the MBS Session as specified in clause 7.2.1.

Figure 8:
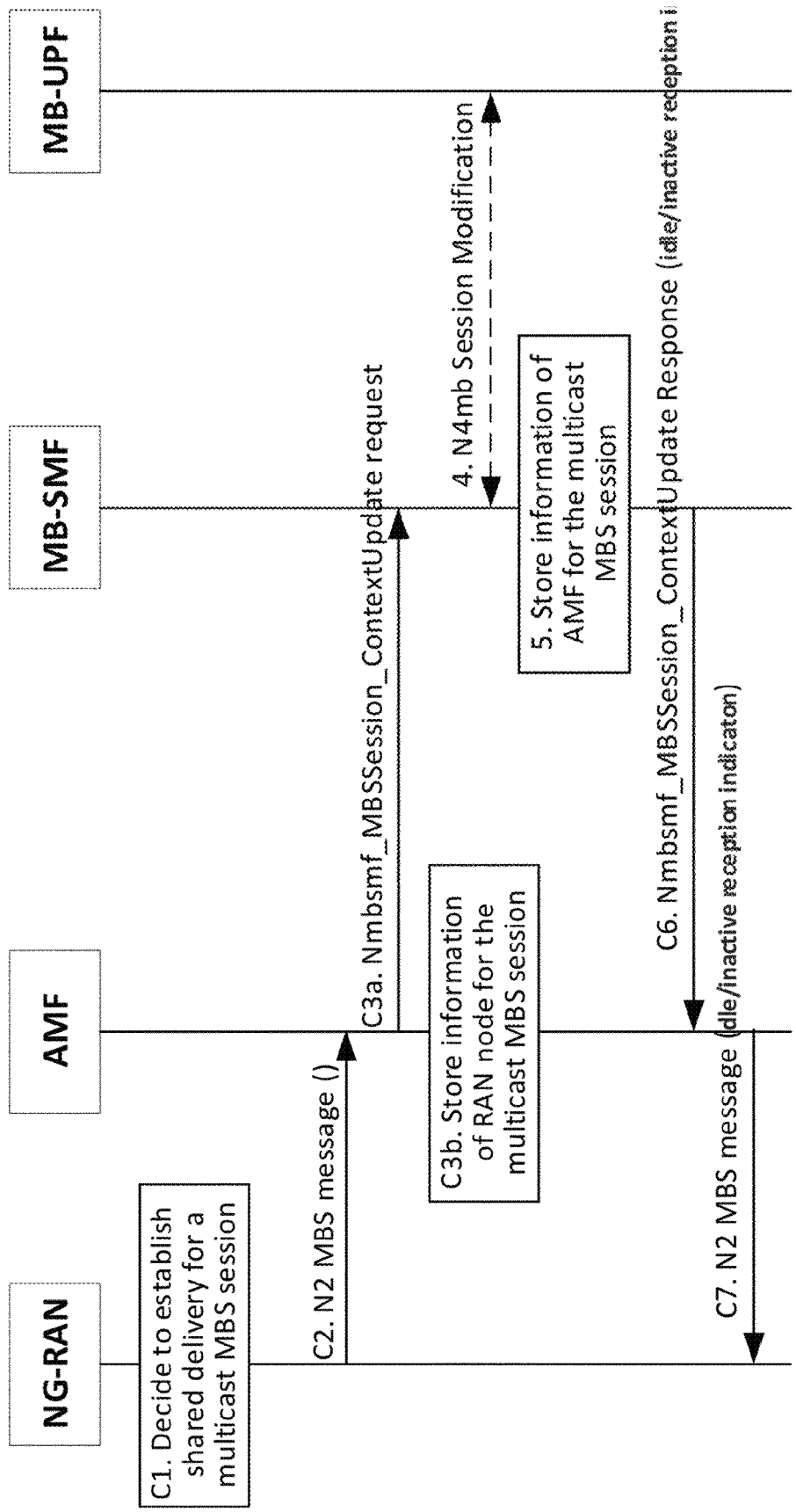
FIG. 8 shows an establishment of shard delivery toward NG-RAN node according to an example embodiment, and FIG. 9 containing

A further example embodiment is described by referring to FIG. 8, which is based on Figure 7.2.1.4-1 of TS 23.247 illustrating an establishment of shared delivery toward a NG-RAN node. In the following, in particular the additions according to the embodiment are described, in particular in which messages the new idle/inactive reception indicator is included.

In C1, it is assumed that a NG-RAN node decides to establish shared delivery for a multicast MBS session when it serves at least one UE within the multicast MBS session. In C2, the NG-RAN sends an N2 MBS Session request message (MBS Session ID, [Area Session ID], N2 SM information ([unicast DL tunnel Info])) towards the AMF. In C3, the AMF selects the MB-SMF serving the multicast MBS session, e.g. using the NRF discovery service or locally stored information. It invokes Nmbsmf_MBSSession_ContextUpdate request (MBS Session ID, [Area Session ID], N2 SM information) to the MB-SMF in C3*a*. The AMF stores the information of the NG-RAN nodes (e.g. NG-RAN node ID) for the subsequent signaling related to the multicast MBS Session in C3*b*. In C4, which is conditional, if the MB-SMF received unicast DL tunnel Info in C3, it configures the MB-UPF to send multicast data for the multicast MBS session (or location dependent content of the multicast MBS session if an area session ID was received) towards that GTP tunnel endpoint via unicast transport. In C5, the MB-SMF stores the information of the AMF (e.g. AMF ID) in the MBS multicast session context (or location dependent part of the multicast MBS session context if an Area Session ID was received) to enable subsequent signalling towards that AMF.

In C6, the MB-SMF sends Nmbsmf_MBSSession_ContextUpdate response to the AMF. Among others, this response includes the new idle/inactive reception indicator. In C7, the AMF sends an N2 MBS Session response message to the NG-RAN node. Also this response message includes this response includes the new idle/inactive reception indicator.

Figure 9A:
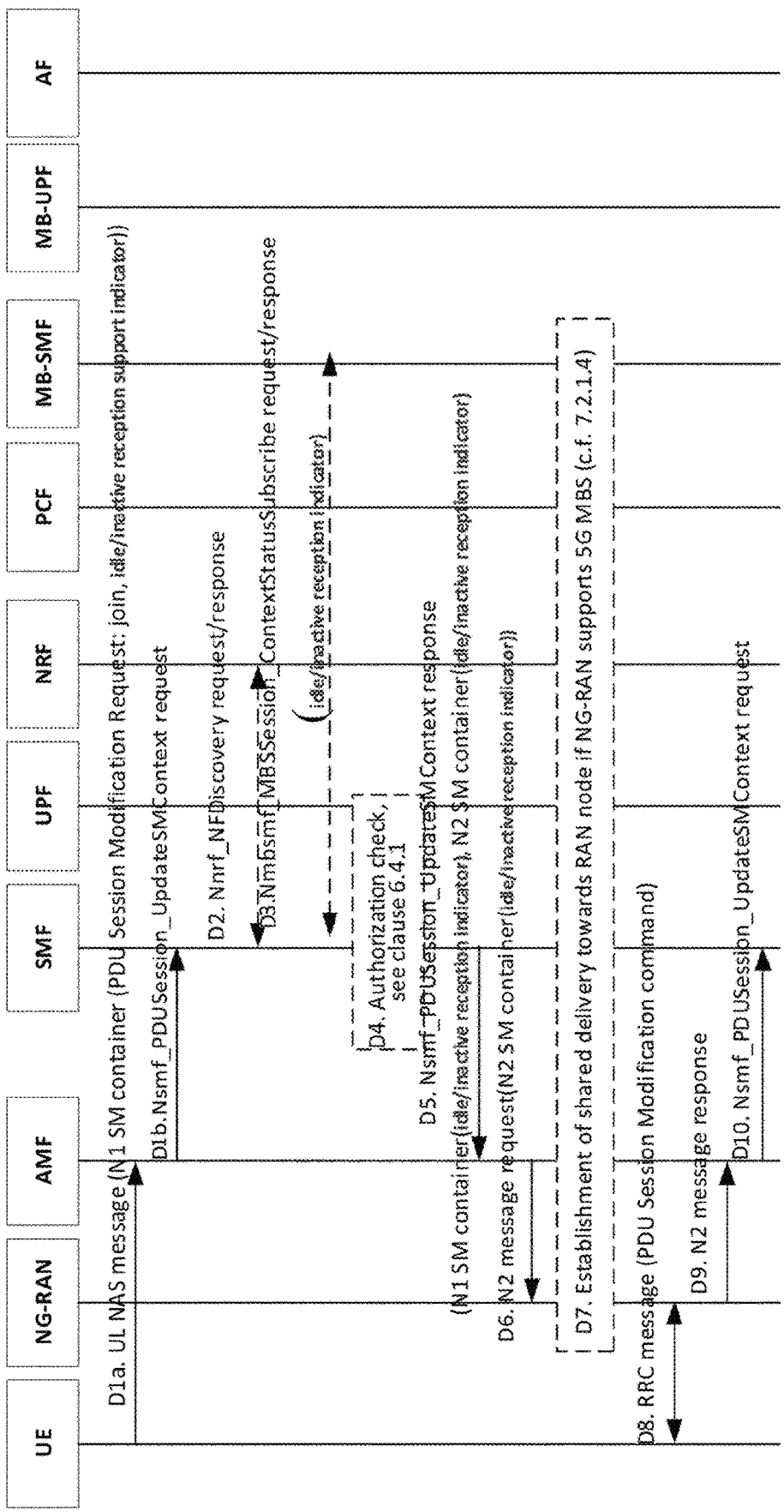
FIGS. 9A and 9B shows a PDU session modification for UE joining multicast session according to an example embodiment.
Figure 9B:
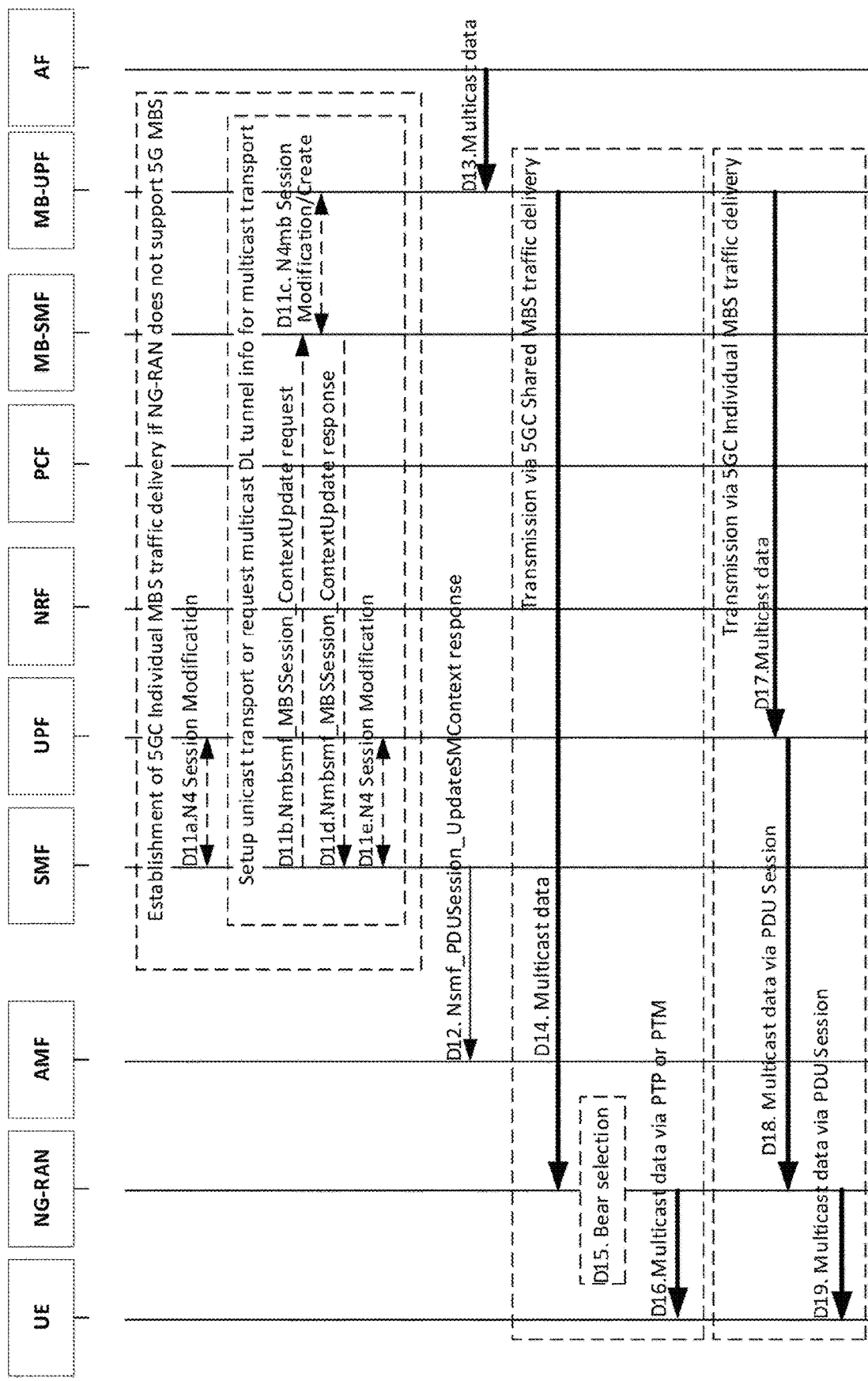

Another example embodiment is described in the following by referring to FIG. 9, which is based on Figure 7.2.1.3-1 of TS 23.247 illustrating a PDU Session modification for UE joining multicast session. FIG. 9 contains FIG. 9A showing processes D1 to D10, and FIG. 9B showing processes D11 to D19. This embodiment describes a variant, in which the UE can indicate its support for idle/inactive reception in the join request and the network can use this as criterion to indicate in the join reply whether idle/inactive reception applies for the MBS session and UE.

In D1, to join the multicast group, the UE sends a PDU Session Modification Request for the associated PDU session which additionally contains one or several MBS Session ID(s) and join request. In detail, the message sent in D1*a* to the AMF contains the new idle/inactive reception indicator. In D2, based on the received MBS Session ID and join request, the SMF determines this is MBS Session join request. In D3, for each MBS session in D1, if the SMF has not subscribed to the MBS session context, it invokes Nmbsmf_MBSSession_ContextStatusSubscribe request (MBS Session ID) towards the MB-SMF to subscribe to events notifications related to the multicast MBS session and to request information about the MBS session context. The MB-SMF responds with the information about the indicated multicast MBS session in Nmbsmf_MBSSession_ContextStatusSubscribe response. The request and the response also contain the new idle/inactive reception indicator.

In D4, the SMF performs an authorization check as described in clause 6.41 of TS 23.247. In D5, if the join request is accepted, the SMF responds to the AMF through Nsmf_PDUSession_UpdateSMContext response (N2 SM information (PDU Session ID, MBS Session ID, [updated PDU Session information], [mapping information between unicast QoS flow(s) and multicast QoS flow(s)]), N1 SM container (PDU Session Modification Command)). This response also includes the new idle/inactive reception indicator.

In D6, the N2 message, which includes the multicast MBS session information and PDU session modification information is sent to the NG-RAN. As mentioned before, this message also includes the new idle/inactive reception indicator.

The following processes D7 to D19 fully correspond to steps 7 to 19 in Figure 7.2.1.3-1 of TS 23.247.

Thus, according to several example embodiments, the new idle/inactive reception indicator can be included in different messages, so that the corresponding network elements can be informed whether to apply idle/inactive reception for a multicast session.

The above-described example embodiments are only examples and may be modified.

Names of network elements, protocols, and methods are based on current standards. In other versions or other technologies, the names of these network elements and/or protocols and/or methods may be different, as long as they provide a corresponding functionality.

In general, the example embodiments may be implemented by computer software stored in the memory (memory resources, memory circuitry) 12, 22, 32, 42, 52 and executable by the processor (processing resources, processing circuitry) 11, 21, 31, 41, 51 or by hardware, or by a combination of software and/or firmware and hardware.

As used in this application, the term "circuitry" refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

The memory (memory resources, memory circuitry) 12, 22, 32, 42, 52 may be of any type suitable to the local technical environment and may be implemented using any suitable data storage technology, such as semiconductor based memory devices, magnetic memory devices and systems, optical memory devices and systems, fixed memory and removable memory, and non-transitory computer-readable media. The processor (processing resources, processing circuitry) 11, 21, 31, 41, 51 may be of any type suitable to the local technical environment, and may include one or more of general purpose computers, special purpose computers, microprocessors, digital signal processors (DSPs) and processors based on a multi core processor architecture, as non-limiting examples.

It is to be understood that the example embodiments described above are illustrative and are not to be construed as limiting. Various modifications and applications may occur to those skilled in the art without departing from the true spirit and scope of the example embodiments.

Some exemplary embodiments provide the following:

A method, in a user equipment, comprising:
receiving an indication whether a transmission mode for inactive/idle reception of multicast is applied for a multicast session, and
based on the indication, performing procedures to enable reception of the multicast session using the transmission mode for inactive/idle mode reception.

A further method, wherein the indication as to whether inactive/idle reception of multicast is applied for the multicast session is included in the announcement for the multicast session.

The method may further comprise
sending a join request message for the multicast session to a network control element, and
receiving a join accept message from the network control element, wherein the join accept message comprises the indication as to whether the transmission mode for inactive/idle reception is enabled for the multicast session.

The method may further comprise
indicating support for idle/inactive reception of multicast in the join request message.

In the method, the procedures to enable reception of the multicast session using the transmission mode for inactive/idle mode reception may comprise monitoring broadcasted information whether the transmission mode for inactive/idle reception of multicast is applied for the multicast session in the cell where the UE is located.

The method may further comprise
receiving data of the multicast session while in RRC-inactive or RRC-idle state.

The method may further comprise, when inactive/idle reception of multicast is to be applied for the multicast session:
omitting feedback concerning reception of the multicast session to the network while the transmission mode for inactive/idle reception of multicast is applied, or
transmitting less feedback concerning reception of the multicast session to the network while the transmission mode for inactive/idle reception of multicast is applied than in case the transmission mode for inactive/idle reception of multicast is not applied for the multicast session.

Some exemplary embodiments may provide a method, in network element performing an application function, comprising:
requesting creation of a multicast session, and
indicating whether a transmission mode for inactive/idle reception of multicast is to be enabled for the multicast session.

The method may further comprise
preparing a service announcement for the multicast session directed to a user equipment, the service announcement comprising an indication whether the transmission mode for inactive/idle reception of multicast is to be enabled for the multicast session.

Some exemplary embodiments may further provide a method, in a network element performing a multicast-broadcast session management function, comprising:
managing a multicast session, and
indicating to network elements involved with the multicast session whether a transmission mode for inactive/idle reception of multicast is to be enabled for the multicast session.

The method may further comprise
receiving an indication as to whether a transmission mode for inactive/idle reception of multicast is to be enabled for the multicast session from the application function, the multicast/broadcast service function, or the network exposure function requesting creation of the multicast session.

In the method, the indication as to whether the transmission mode for inactive/idle reception of multicast is to be enabled for the multicast session may be preconfigured in the network.

In the method, the indication to network elements involved with the multicast session whether the transmission mode for inactive/idle reception of multicast is to be enabled for the multicast session may comprise at least one of:
an indication to a session management function whether the transmission mode for inactive/idle reception of multicast is to be enabled for the multicast session in a Nmbsmf_MBSSession_ContextStatusSubscribe response;
an indication to an access management function whether the transmission mode for inactive/idle reception of multicast is to be enabled for the multicast session in an Nsmf_PDUSession_UpdateSMContext response; or
an indication to an radio access network node whether the transmission mode for inactive/idle reception of multicast is to be enabled for the multicast session in an N2 session management container.

Some exemplary embodiments may provide a method, in a network element performing a session management function, comprising:
receiving a join request message for a multicast session from a user equipment, and
sending a join accept message in response to the join request message, wherein the join accept message comprises an indication as to whether a transmission mode for inactive/idle reception of multicast is to be enabled for the multicast session.

In the method, the join accept message may comprises the indication as to whether the transmission mode for inactive/idle reception of multicast is to be enabled in at least one of:
an N1 session management container to be transmitted to the user equipment; or an N2 session management container to be transmitted to an radio access network node.

In the method the join request message for the multicast session received from the user equipment may comprise information that the user equipment supports the transmission mode for idle/inactive reception of multicast.

The method may further comprise
receiving an indication from a multicast-broadcast session management function as to whether the transmission mode for inactive/idle reception of multicast is to be enabled for the multicast session.

In the method the sent indication as to whether the transmission mode for inactive/idle reception of multicast is to be enabled for the multicast session may be determined based on at least one of:
the received indication from the multicast-broadcast session management function; or
the received information from the user equipment that that the user equipment supports the transmission mode for idle/inactive reception of multicast.

Some exemplary embodiments may provide a method, in a network element performing a radio access network node, comprising:
receiving information about a multicast session comprising an indication as to whether the transmission mode for inactive/idle reception of multicast is to be enabled for the multicast session:
deciding, at least partially based on the received indication, whether to apply the transmission mode for inactive/idle reception of multicast for the multicast session in at least one radio cell served by the apparatus; and
transmitting data of the multicast session in the radio cell using the decided transmission mode.

The method may further comprise
broadcasting an indication in the at least one radio cell as to whether the transmission mode for inactive/idle reception of multicast is applied for the multicast session;
keeping a user equipment that joined the multicast session located within the at least one radio cell in RRC-connected state while the multicast session is active if the transmission mode for inactive/idle reception of multicast is not being applied for the multicast session; and
allowing a user equipment that joined the multicast session located within the at least one radio cell to transition to RRC-inactive state or RRC-idle state while the multicast session is active if the transmission mode for inactive/idle reception of multicast is being applied for the multicast session.

The invention claimed is:

1. A user equipment, comprising:
at least one processor and at least one memory including computer program code, the at least one memory and the computer program code configured to, with the at least one processor, cause the user equipment at least to:
receive an indication whether a transmission mode for inactive mode reception of multicast is applied for a multicast session, and
based on the indication, perform procedures to enable reception of the multicast session using the transmission mode for inactive mode reception of multicast for the multicast session,
wherein the user equipment is caused to perform procedures by configuring operations based on the indication to omit feedback concerning reception of the multicast session to a network while the transmission mode for inactive mode reception of multicast for the mulitcast session is applied.

2. The user equipment according to claim 1, wherein the indication is indicative of whether inactive mode reception of multicast is applied for the multicast session.

3. The user equipment according to claim 1, wherein the at least one memory and the computer program code are further configured to, with the at least one processor, cause the user equipment to:
send a join request message for the multicast session to a network control element, and
receive a join accept message from the network control element.

4. The user equipment according to claim 3, wherein the at least one memory and the computer program code are further configured to, with the at least one processor, cause the user equipment to:
indicate support for inactive mode reception of multicast for the multicast session.

5. The user equipment according to claim 1, wherein the procedures to enable reception of the multicast session using the transmission mode for inactive mode reception of multicast for the multicast session comprise information whether the transmission mode for inactive mode reception of multicast is applied for the multicast session in the cell where the user equipment is located.

6. The apparatus according to claim 1, wherein the at least one memory and the computer program code are further configured to, with the at least one processor, cause the apparatus to:
receive data of the multicast session while in radio resource control (RRC)-inactive.

7. An apparatus, in a network element performing a session management function, comprising:
at least one processor and at least one memory including computer program code, the at least one memory and the computer program code configured to, with the at least one processor, cause the apparatus at least to:
receive a join request message for a multicast session from a user equipment, and
send a join accept message in response to the join request message, wherein the join accept message comprises an indication as to whether a transmission mode for inactive mode reception of multicast is to be enabled for the multicast session,
wherein based on the indication that the transmission mode for inactive mode reception of multicast for the multicast session is enabled, reception of the multicast session by the user equipment is enabled while causing feedback from the user equipment concerning reception of the multicast session to be omitted.

8. The apparatus according to claim 7, wherein the join accept message comprises the indication as to whether the transmission mode for inactive mode reception of multicast for the multicast session is to be enabled in at least one of:
an N1 session management container to be transmitted to the user equipment; or
an N2 session management container to be transmitted to a radio access network node.

9. The apparatus according to claim 8, wherein the join request message for the multicast session received from the user equipment comprises information that the user equipment supports the transmission mode for idle/inactive mode reception of multicast for the multicast session.

10. The apparatus according to claim 7, wherein the at least one memory and the computer program code are further configured to, with the at least one processor, cause the apparatus to:

receive an indication from a multicast-broadcast session management function as to whether the transmission mode for inactive mode reception of multicast is to be enabled for the multicast session.

11. The apparatus according to claim 7, wherein the sent indication as to whether the transmission mode for inactive mode reception of multicast is to be enabled for the multicast session is determined based on at least one of:

the received indication from the multicast-broadcast session management function; or the received information from the user equipment that the user equipment supports the transmission mode for idle/inactive mode reception of multicast for the multicast session.

12. An apparatus, in a network element performing a radio access network node function, comprising:

at least one processor and at least one memory including computer program code, the at least one memory and the computer program code configured to, with the at least one processor, cause the apparatus at least to;

receive information about a multicast session comprising an indication as to whether the transmission mode for inactive mode reception of multicast is to be enabled for the multicast session;

decide, at least partially based on the received indication, whether to apply the transmission mode for inactive mode reception of multicast for the multicast session in at least one radio cell served by the apparatus; and transmit data of the multicast session in the at least one radio cell using the decided transmission mode, wherein based on the indication that the transmission mode for inactive mode reception of multicast for the multicast session is enabled, reception of the multicast session by user equipment of the at least one radio cell is enabled while causing feedback from the user equipment concerning reception of the multicast session to be omitted.

13. The apparatus according to claim 12, wherein the at least one memory and the computer program code are further configured to, with the at least one processor, cause the apparatus to perform at least one of:

broadcast an indication in the at least one radio cell as to whether the transmission mode for inactive mode reception of multicast is applied for the multicast session;

keep the user equipment that joined the multicast session located within the at least one radio cell in a radio resource control (RRC)-connected state while the multicast session is active if the transmission mode for inactive mode reception of multicast is not being applied for the multicast session; and allow the user equipment that joined the multicast session located within the at least one radio cell to transition to a RRC-inactive state or a RRC-idle state while the multicast session is active if the transmission mode for inactive mode reception of multicast is being applied for the multicast session.

14. The apparatus according to claim 12, wherein the apparatus is further caused to negotiate with the user equipment to cause the user equipment to transition to a radio resource control (RRC)-inactive or a RRC-idle state while the user equipment is within the multicast for the multicast session.

15. The apparatus according to claim 12, wherein the apparatus is caused to prevent paging of the user equipment while the transmission mode for inactive mode reception of multicast for the multicast session is enabled.

16. The user equipment according to claim 1, wherein the user equipment is further caused to negotiate with the network to cause the user equipment to transition to a radio resource control (RRC)-inactive or a RRC-idle state while the user equipment is within the multicast for the multicast session.

* * * * *